Figure 1:
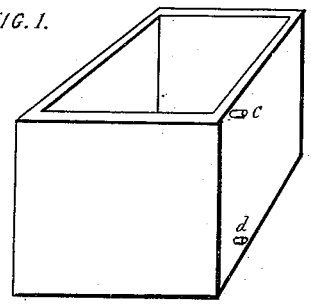

(No Model.) 2 Sheets—Sheet 1.

G. RICHMOND.
ART OF COOLING BY THE USE OF REFRIGERATING LIQUIDS AND APPARATUS THEREFOR.

No. 356,210. Patented Jan. 18, 1887.

WITNESSES:
A. H. Briggs
Jos. S. Michael.

INVENTOR
Geo Richmond (No Model.) 2 Sheets—Sheet 2.

G. RICHMOND.
ART OF COOLING BY THE USE OF REFRIGERATING LIQUIDS AND APPARATUS THEREFOR.

No. 356,210. Patented Jan. 18, 1887.

WITNESSES:
A. H. Briggs
Jos. S. Michael

INVENTOR
Geo Richmond

UNITED STATES PATENT OFFICE.

GEORGE RICHMOND, OF NEW YORK, N. Y.

ART OF COOLING BY THE USE OF REFRIGERATING LIQUIDS AND APPARATUS THEREFOR.

SPECIFICATION forming part of Letters Patent No. 356,210, dated January 18, 1887.

Application filed June 29, 1886. Serial No. 206,579. (No model.)

*To all whom it may concern:*

Be it known that I, GEORGE RICHMOND, a citizen of Great Britain, and a resident of New York city, in the county and State of New York, have invented a new and useful Improvement in the Art of Cooling by the Use of Refrigerated Liquids and of Apparatus for the Practical Application thereof, of which the following is a specification and such a full, clear, and exact description of the invention, as will enable others skilled in the art to which it appertains to make and use the same.

Heretofore it has been common to use a refrigerator-tank or other suitable vessel in connection with refrigeration machinery for the purpose of holding a supply of brine or other cooled liquid for use as a reserve with which, so far as possible, to keep down the temperature in the circulating-pipes connected therewith and extending through the cold rooms while from any cause the refrigeration-machine might be unable to perform the work required of it or be at rest. Unless such storage-tanks were of a very large size their beneficial effect in maintaining a low temperature when the machine is not in operation would be of comparatively short duration; and if such storage-tanks were excessively large the capacity of the refrigeration-machine would be overtaxed in performing the work necessary to preserve the required low temperature in such tanks, as well as that in circulation going on therefrom through the pipes in the cold rooms.

The object of my invention is to provide inexpensive and automatically-operating means whereby the liquid in such storage-tanks can be kept practically at the same uniform low temperature required, whether the refrigeration-machine be working at its maximum or minimum capacity, and for a much increased period of time after its operation shall have altogether ceased.

In the case of a brewery, for example, that is provided with a machine capable, when run at its maximum speed continuously, of reducing and holding the temperature in the brine in use in the pipes and refrigeration or storage tanks, (whichever are used,) below what is necessary for cooling of its cellars to the degree desired, it is practicable by the use of my invention to maintain the desired temperature in the cellars, and yet allow such a machine to remain entirely inactive during the night; or, in the case where the machine is just of sufficient capacity to do the work required of it during the hot hours of the day, or is not quite able to accomplish that, then, if its operation be continued through the cooler hours of the night, when the loss is least, it will in the latter case, by the use of my invention, be enabled to perform its work with ease during the succeeding day, and in the former case it can be run at a slower rate of speed during the day.

My invention consists (to use popular language) in storing up the surplus cold whenever such surplus is produced by the refrigerating-machine and in automatically yielding up the same to use when need therefor arises.

The accompanying drawings show forms of construction, devices, and arrangements in simple forms suitable for carrying my invention into practice; but their forms and arrangements may be varied, as will be apparent to any one skilled in the art, without departing from the spirit of my invention.

Figure 3:
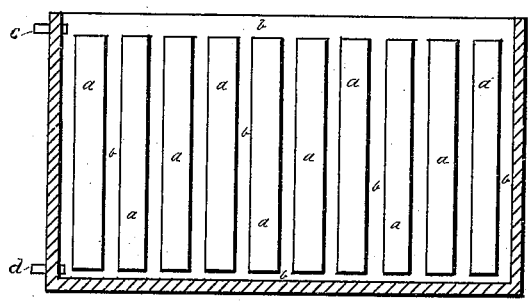
Figure 2:
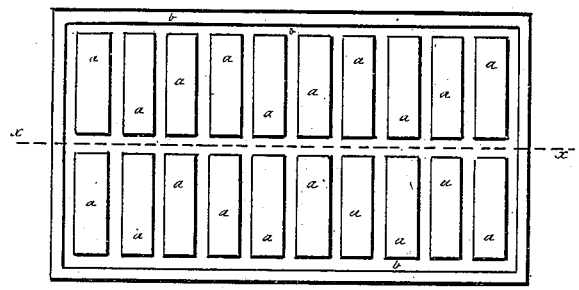
Figure 4:
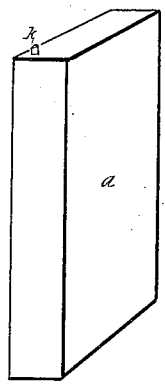
Figure 5:
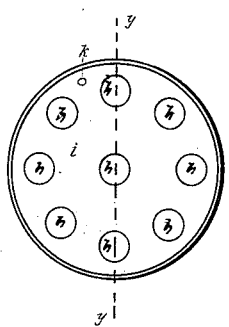
Figure 7:
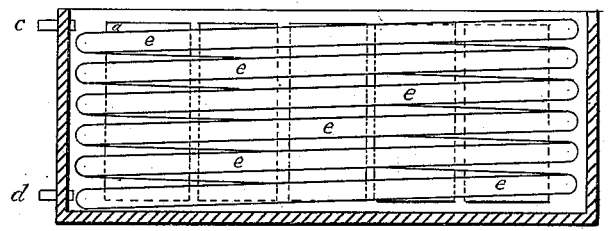
Figure 8:
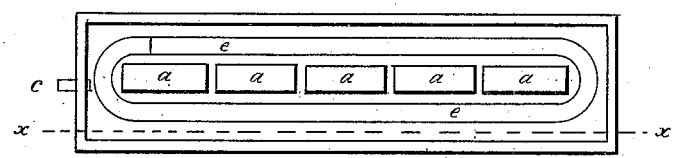
Figure 9:
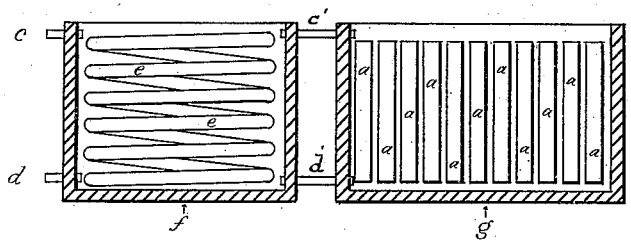
Figure 10:
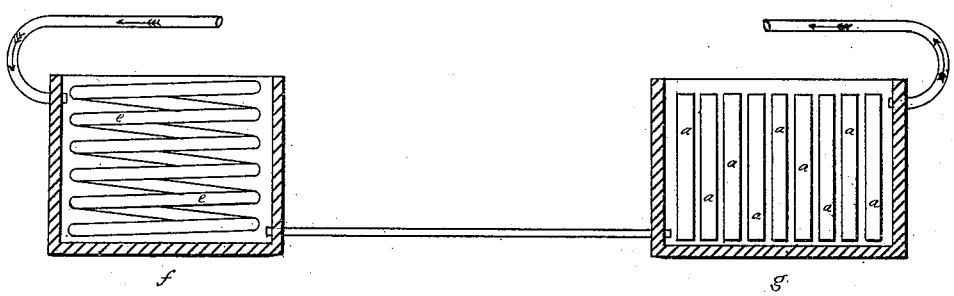

Figure 1 shows in perspective a rectangular tank with the cover removed. Fig. 2 is a plan, and Fig. 3 is a side elevation, in section, (through $x\,x$, Fig. 2,) showing the arrangement in the tank, Fig. 1, and in relation to each other of a series of metallic cases, one of which is shown in Fig. 4 on an enlarged scale. Fig. 5 shows in plan, and Fig. 6 in section, (through $x\,x$, Fig. 5,) a modification of the case shown in Fig. 4, and is of the ordinary form of construction of a cylindrical tubular steam-boiler. Fig. 7 shows in sectional elevation (through $x\,x$, Fig. 8,) a simple form of refrigerator adapted to utilize my invention without the aid of an auxiliary tank, and Fig. 8 shows a plan of the same. Fig. 9 shows in sectional elevation the arrangement of the auxiliary tank, Fig. 1, and the refrigerator, Figs. 7 and 8; and Fig. 10 shows in sectional elevation the refrigerator, Fig. 7, and the tank, Fig. 1, so arranged that the tank and its contents is placed directly in the general circulatory system and ceases to be simply an auxiliary tank.

Similar letters of reference indicate corresponding parts in all of the drawings so far as used.

$a\,a\,a$ are thin metallic cases.

*b b b* are spaces between, beside, beneath, and above the metallic cases *a*.

*c* and *d* are tubes inserted through the wall of the tank, Figs. 1 and 9, with which to make connections with the refrigerator, as shown in Fig. 9, when the tank, Fig. 1, is used simply as an auxiliary tank.

*f f*, Figs. 9 and 10, are the refrigerators, and *g g*, same figures, are the tanks.

Figure 6:
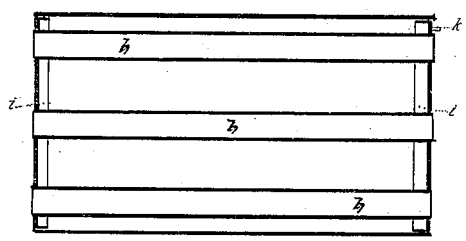

*h h h*, Figs. 5 and 6, are tubes opening through the heads or tube-sheets *i i*, and *k k*, Figs. 4 and 5, are openings into the respective cases.

As already suggested, my invention can be applied to use within a refrigerator of suitable construction, as shown in Fig. 7, or in a tank connected therewith, and in the direct circulatory system of the refrigeration plant, as shown in Fig. 10, or strictly as an auxiliary tank, as shown in Figs. 1 and 9, as will be hereinafter described.

In carrying my invention into practice I fill the cases *a* through the openings *k* with a liquid that will congeal at the temperature it is desired to maintain in the tank or refrigerator in which it is to be used. They are then securely closed, so as to prevent leakage or evaporation that might change the character of the contents. In using the modified form of case shown in Figs. 5 and 6 this liquid fills all the space *i i i* around the tubes and within the heads and case.

The liquid so used may be water holding in solution the requisite percentage of salt, or any other liquid that it is known will congeal at the temperature desired; but the salt solutions are convenient, as their congealing-point falls practically one degree Fahrenheit for every one per cent. (in weight) of salt added. When so filled and closed, these cans are placed in the tank or refrigerator, arranged, substantially as shown in the drawings, so that they are not in contact with each other or the tank or refrigerator or any of its parts, and they may be supported above the bottom of the tank by suitable ledges or on pieces of wood or iron, not deemed necessary to be shown. The tank or refrigerator is then to be filled with the liquid needed for circulation through the refrigerator plant, which should completely cover the cans and be of such a character that it will not congeal until its temperature falls considerably below the freezing-point of the liquid contained in the closed cases. In lieu of the forms of cases shown, suitable compartments may be permanently constructed in the refrigerator or tank.

The operation is as follows: Whenever the working of the refrigeration-machine which cools the circulating liquid reduces the temperature of that liquid in the tank or refrigerator to the congealing-point of the liquid contained in the closed cases, it, congealing, stores up within those cases a supply of cold—negative thermal units—that will be given off automatically through the walls of these cases into the surrounding liquid in the tank or refrigerator whenever from any cause the temperature of that surrounding liquid rises above the congealing-point of the contents of the cases. In other words, the liquid contents of these cases takes up the excess of low temperature that may be temporarily produced in the liquid surrounding them, and yields it up again whenever a rise in the temperature of that liquid requires it, both actions being automatic and each controlled entirely by the temperature of the surrounding liquid, and that control being exercised as the needs of its use may require, and thus it is to such a refrigerator or supply-reservoir practically what the fly-wheel is to an engine or the accumulator to hydraulic machinery.

When my invention is applied in a refrigerator and no tank is employed, the operation is above fully described, as the manner of circulating the cooling-brine within refrigeration-machines is well understood.

When it is applied in an auxiliary tank, that tank may be placed directly in the circulatory system near the refrigerator, as shown in Fig. 10, or at any other convenient point not far distant in the direction of the flow of the brine, which, in the drawings, is indicated by the flight of the arrows. When, however, it is used in a tank that is strictly an auxiliary tank, as shown in Fig. 9, being out of the direct line of the circulation, its circulation is from the refrigerator by connection currents through the pipes *c' d'*, the direction of which, while the cans are accumulating a store of cold, is into the tank through the pipe *d* and out through the pipe *c*, and reversed whenever the occasion arrives for the cans to give up of their store.

I claim as new and desire to secure by Letters Patent—

1. The method of securing a more uniform temperature in the liquid in use in the circulatory system of a refrigeration plant, consisting in the exposure in such circulatory liquid of closed vessels containing a liquid that will not congeal at the temperature at which it is desired to maintain the temperature of the circulating liquid, but will congeal when it reaches a lower temperature, substantially as set forth.

2. The method of preserving a low temperature in the circulating liquid of a refrigeration plant when the refrigeration-machine is temporarily insufficient or inoperative, consisting in the exposure in such circulating liquid of closed vessels containing a liquid that will not congeal at the temperature at which it is desired to maintain the circulating liquid, but will congeal when the liquid reaches a lower temperature, thereby storing up and holding a supply of negative heat-units to be automatically transferred to the circulating liquid as the rise of its temperature incident to its continued use may require.

3. In the refrigerator of a refrigeration-machine of the liquid-circulating type, the combination, with its refrigeration-pipes and casing, of closed vessels to contain a liquid that will congeal at a temperature above the minimum working temperature of the machine, but below the temperature to be maintained in that circulating liquid, substantially as and for the purposes set forth.

4. In combination with the refrigerator and circulating system of a refrigeration-machine of the liquid-circulating type, a tank placed in the circulation system and provided with closed vessels to contain a liquid that will congeal at a temperature above the minimum temperature of the refrigerator, but below the temperature to be maintained in the circulating liquid, all connected and arranged to operate substantially as and for the purpose set forth.

5. In combination with the refrigerator and circulating system of a refrigeration-machine of the liquid-circulating type, an auxiliary tank connected with the refrigerator and provided with closed vessels to contain a liquid that will congeal at a temperature above the minimum working temperature of the refrigerator, but below the temperature to be maintained in the circulating liquid, to operate substantially as and for the purpose set forth.

In testimony that I claim the foregoing as my invention I have signed my name, in presence of two witnesses, this 28th day of June, 1886.

GEO. RICHMOND.

Witnesses:
  A. H. BRIGGS,
  JOSEPH B. LYMAN.